Sept. 14, 1965

J. A. MAURO 3,206,603

INFRARED FLAW DETECTOR METHOD AND APPARATUS

Filed Aug. 16, 1962

Inventor:
Jack A. Mauro,
by Paul A. Frank
His Attorney.

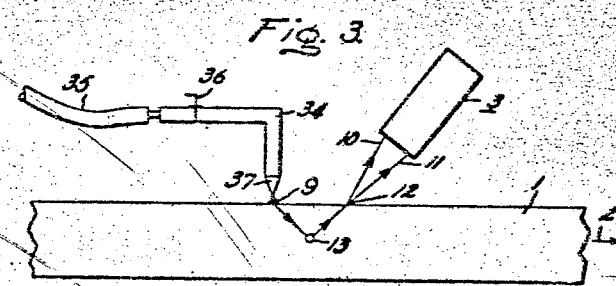
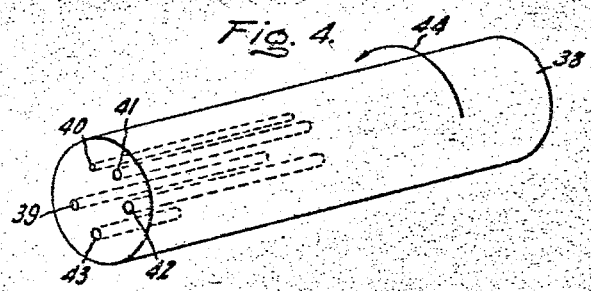
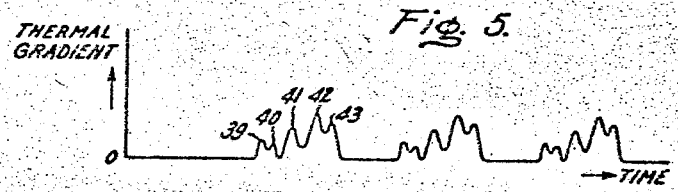

Inventor:
Jack A. Mauro,
by Paul A. Frank
His Attorney.

United States Patent Office 3,206,603
Patented Sept. 14, 1965

3,206,603
INFRARED FLAW DETECTOR METHOD AND APPARATUS
Jack A. Mauro, Pittsfield, Mass., assignor to General Electric Company, a corporation of New York
Filed Aug. 16, 1962, Ser. No. 217,317
14 Claims. (Cl. 250—83.3)

My invention relates to a method and apparatus for detecting flaws within heat conductive mediums and, in particular, to a method and apparatus for detecting minute subsurface and interlaminar voids and other flaws in composite metallic members wherein the detection is accomplished by a noncontacting and nondestructive process.

Welding, brazing, cladding and electroplating are several methods employed for joining metals in the fabrication of aircraft, space vehicles and engines. The environmental conditions under which the final components are subjected demand strength and reliability of the fused parts. Under high temperature operational conditions, minute voids in the subsurface region of the metallic component, particularly in the interlaminar region that joins composite metallic members, can expand sufficiently to rupture the joint. Gaseous accumulations in the interlaminar spaces due to faulty fusion of metals can result in chemical interactions that impair the performance reliability, strength and durability of the component. In like manner, variations in the thickness of a heat conductive coating on a base heat conductive material may result in significant changes in operation of the component. A flaw as referred to herein is defined as any inhomogeneity which affects the flow of radiant energy through, or reflection from, a material, thus it includes variations in coating thickness.

Methods and instruments presently used to detect flaws in solid materials, and particularly in composite members comprising a base portion and an overlying or clad portion, employ numerous devices and materials including evaporgraphs, phosphors, thermal paints, thermal dyes, ultrasonics, and image converters. Satisfactory operation of these instruments is usually limited by the particular shape or geometrical configuration of the material being examined, character and depth of the flaw, and the size of the probe or sensing device. In the case of voids, though such instruments may provide gross and qualitative data, they do not provide precise and accurate quantitative data concerning subsurface voids smaller than 0.070 inch diameter. Further, conventional methods and instruments cannot accurately detect variations in the order of $10/1000$ inch in the thickness of a metallic coating by a noncontacting and nondestructive process. Since presently used methods and instruments cannot be employed to detect subsurface voids smaller than 0.070 inch diameter or coating thickness variations of 0.010 inch with a high degree of accuracy, a need exists for solving this problem by providing a new method and apparatus for flaw detection.

Therefore, one of the principal objects of my invention is to develop a new and improved method and apparatus for detecting extremely small subsurface voids in a material.

Another important object of my invention is to develop a new and improved method and apparatus for detecting minute subsurface voids whereby no physical contact is required between the material being examined and the apparatus.

Still another important object of my invention is to develop a new and improved method and apparatus for detecting minute subsurface voids whereby the characteristics of the material being examined are not altered.

A still further important object of my invention is to develop a new and improved method and apparatus for detecting small variations in the thickness of a heat conductive coating on a base material.

Briefly stated, and in accordance with one aspect of my invention in meeting the objects enumerated above, I provide an apparatus that applies energy in a nondestructive manner to the surface of a material being inspected, thereby establishing a thermal gradient on the surface thereof in accordance with occurrence of voids or other flaws within the material. A detector component of the apparatus senses the thermal gradient which may be recorded wherefrom the location and size of voids or flaws may be determined.

The features of my invention which I desire to protect herein are pointed out with particularity in the appended claims. The invention itself, however, both as to its organization and method of operation, together with further objects and advantages thereof, may best be understood by reference to the following description taken in connection with the accompanying drawing, wherein like parts in each of the several figures are identified by the same reference character, and wherein:

FIGURE 3 illustrates a modification of my invention indicating another means for applying energy to the surface of a material being inspected;

FIGURE 4 illustrates a test specimen with selectively the same side of the material being tested; and FIGURE 5 is a graphical result of the use of my invention with the specimen of FIGURE 4, plotting thermal gradient versus time.

Figure 1:
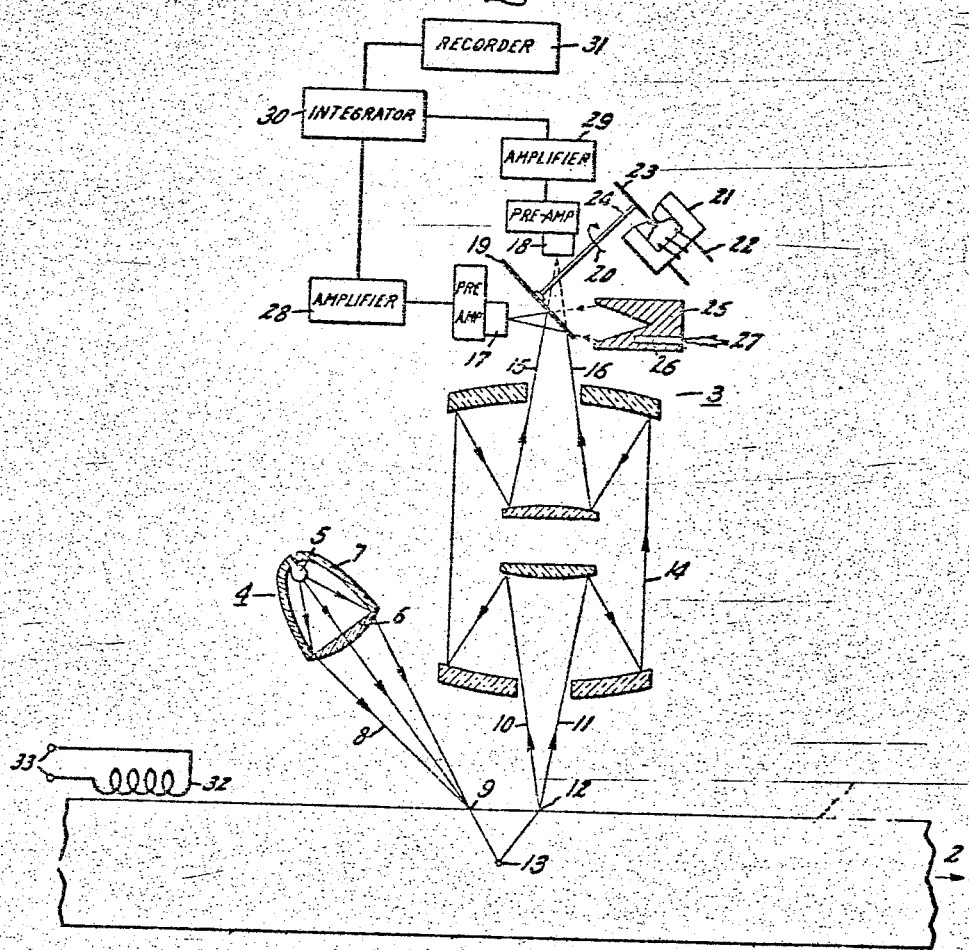
FIGURE 1 illustrates a general arrangement of a flaw detector constructed in accordance with my invention and employing a conventional thermal radiation detector.

Referring particularly to the apparatus illustrated in FIGURE 1, there is shown a heat conductive material 1 to be inspected that moves in the direction of arrow 2 in noncontacting relationship with respect to a conventional thermal radiation detector indicated as a whole by numeral 3. The particular conventional thermal radiation detector shown in FIGURE 1 will be described in detail to illustrate a method whereby such devices may be employed to detect subsurface voids and other flaws in materials. An energy source for generating heat within material 1 comprises an essential element of the flaw detecting apparatus. The energy may be supplied by radiation, induction or conduction. A radiant energy source indicated as a whole by numeral 4 and illustrated schematically as a heated filament 5 and convex lens 6 within a paraboloidal or ellipsoidal body or frame 7, impinges its emitted rays 8 upon a surface of the material 1 at focal point 9. The energy of rays 8, being focussed at point 9, thus generates a predetermined amount of heat which is absorbed by material 1. This heat is preferably supplied at a constant rate and material 1 moves at a constant rate thereby effecting a constant rise in temperature of the surface of material 1 in the absence of any voids or flaws therein. However, within those portions of material 1 wherein a subsurface void or flaw exists, a change in the surface constant temperature rise, hereinafter referred to as a thermal gradient, occurs. The occasion of a thermal gradient may be explained in the following manner. Air is a relatively poor heat conductive material, and a void or other flaw located within the sub-surface of a relatively good heat conductive material may be considered to be a minute air pocket. The application of heat to the surface of a good heat conductive material having a minute void within its subsurface effects a change in the temperature distribution therein since the normal distribution of isothermal lines within the good heat conductive material is disrupted by the presence of a poor heat conductive region. This change in the temperature distribution results in what may be described as a hot spot at the surface directly above the subsurface void in the case where heat is applied to the surface from the same side of the material as the thermal radiation detector is disposed in relation thereto. In like manner, a cold spot is sensed by the detector when the heat source is positioned on the opposite side of the material from the detector.

Thus, a thermal gradient or change in the surface temperature indicates the presence of a void or other flaw within the subsurface of material 1, the thermal difference at the surface being a function of the size of the void and the heat conductive characteristics of material 1.

In general, the detectability of thermal differences depends upon the sensitivity of the detector material employed and the radiation temperature of the material being inspected. Radiant energy in the infrared portion of the radiant energy spectrum is preferably employed although it is to be understood that other portions of the spectrum may also be utilized, the only requirement being that the radiant energy emitted from the material 1 surface and indicated as emitted rays 10 and 11, be of sufficient intensity to be easily sensed by thermal radiation detector 3. These rays 10 and 11 are illustrated as emitting from point 12 on the material 1 surface due to the angle of incidence of rays 8, and are characteristic of the induced thermal gradient that indicates the presence of void 13 located in the subsurface of the material. An optical system is employed to image the small area being examined and illustrated as point 12, upon the actual sensing element of detector 3 and, as illustrated, permits entrance only of emitted rays 10 and 11 from the surface of material 1 into the sensing portion of the detector. The optical system may comprise a single lens or a multi-lens system. A Cassegrain mirror telescope which is free of chromatic aberration and absorption is illustrated by way of example in FIGURE 1 although other optical systems may also be employed. Rays 10 and 11 are shown as rays 14 within this system and finally are emitted therefrom as focussed rays 15 and 16.

Figure 2:
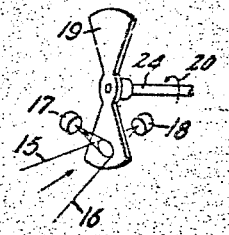
FIGURE 2 is a detailed view of a rotating chopper mirror shown in FIGURE 1.

The sensing means employed for detecting a thermal gradient on the surface of material 1 is positioned in the final image plane of the optical system and comprises two conventional thermal sensitive detectors known as thermistor bolometers. It is to be understood that any infrared detector may be utilized. However, where thermistor bolometers are used, each bolometer consists of a flake-form thermistor or sintered semi-conductor material having a high negative coefficient of resistance which provides a fast time response and high sensitivity to very small temperature changes. The radiant energy as sensed by bolometers 17 and 18 is adapted to detect a thermal gradient at the surface of material 1 in the following manner. A chopper mirror 19, shown in detail in FIGURE 2, is rotated in the direction of arrow 20 by electromagnet 21 which is energized by coil 22 connected to a suitable source of electrical power. Armature 23 is attached to one end of shaft 24, the other end mounting chopper mirror 19. The action of rotating chopper mirror 19 alternately impinges focussed rays 15 and 16 upon bolometers 17 (as shown) and 18. A black body reference source 25 is positioned adjacent chopper mirror 19 in a manner to be hereinafter described in detail. A black body may be described as a device which emits radiant energy, absorbs radiant energy but reflects no energy, thus the emitted radiant energy therefrom may be controlled by controlling the temperature thereof. Thermocouple 26 and its associated leads 27 may be connected to a temperature indicating device (not shown) to monitor the temperature of black body 25. Hereafter the radiation or energy emitted from black body 25 will be referred to as the reference energy. The reference energy is adjusted to be equal to the energy of focussed rays 15 and 16 in the absence of any void or flaw within material 1. This reference energy is either reflected by mirror 19 to bolometer 18 (as shown) or passes directly to bolometer 17 when mirror 19 is in a noninterfering mode. Thus bolometers 17 and 18 receive alternate pulses of focussed energy rays 15, 16 and alternate pulses of reference energy from black body 25 through the action of rotating chopper mirror 19 in a sequence whereby the emitted radiation or temperature of the surface of material 1 is compared with the black body radiation or temperature. The outputs of bolometers 17 and 18 are electrical pulses which pass through a preamplifier stage and are then amplified by amplifiers 28 and 29 and the outputs thereof are connected to integrator 30. The bolometers and their associated amplifiers are thus connected in a differential arrangement whereby in the absence of a void or flaw within material 1, the output of each amplifier is equal and the output of integrator 30 is zero. Only in the presence of a void or flaw will integrator 30 register an output as a result of the different emitted radiation detected as chopper mirror 19 rotates and material 1 moves thereby. The output of integrator 30 is connected to a brush recorder 31 which provides a visual recording of the results. The amplifiers 28 and 29, integrator 30, and recorder 31 may be any conventional electrical components of this type well known in the art. The trace from brush recorder 31 forms a permanent record of thermal contours or isotherms, and relative to the straight line, the reference temperature level or axis of abscissas on the graph of FIGURE 5, indicates the location and relative size of the voids as a function of the temperature gradients.

FIGURE 1 also illustrates a modification of the means for applying energy to the surface of material 1. This modification illustrates an energy source that generates heating within material 1 by induction. An induction heating coil 32 is wrapped around material 1 and connected to a suitable source of power at terminals 33 to generate an adequate surface temperature.

FIGURE 3 illustrates another modification of the means for applying energy to the surface of material 1 being inspected and moving in the direction of arrow 2. This modification illustrates an energy source that generates heating within material 1 by conduction. Tube 34 has at one end flexible tubing 35 and supply control valve 36, and a gas flame 37 at the other end. Valve 36 controls a gas supply and therefore the size of the flame 37. The flame 37 at point 9 introduces heat energy into material 1 by direct contact whereby at point 12 emitted rays 10 and 11 are characteristic of the thermal gradient at the surface of the material due to void 13. Detector 3 may be similar to the detector illustrated in FIGURE 1, but it is to be understood that other thermal radiation detectors that provide a differential temperature measurement may also be employed.

In the heretofore described methods for applying energy to the surface of material 1, it is important that an adequate surface temperature be achieved. This adequate surface temperature varies with the particular material being inspected and depth of inspection but by way of example is approximately 45° C. for bar stock of steel or cladded molybdenum. A temperature differential of 0.04° C. is readily detected, thereby permitting the detection of subsurface voids at least as small as 0.020 inch diameter. The depth to which the voids may be detected is dependent on the intensity of the energy source, a more intense source permitting detection to a greater depth.

FIGURE 4 illustrates a test specimen 38 in which a number of different diameter holes have been drilled, namely 39–43. These holes are in effect voids. The test specimen 38 is rotated in the direction 44 by means of a drill press machine, for example, and radiant energy is applied to the specimen surface in a manner as shown in FIGURE 1. FIGURE 5 indicates a graphical result of the test performed on the specimen in FIGURE 4 wherein a suitable detector is employed, as heretofore described to detect subsurface voids. FIGURE 5 represents the type of recorded result obtained from recorder 31 and shows detected thermal gradients for holes 39–43 wherein these holes have the following diameters respectively, 0.040, 0.030, 0.625, 0.1875 and 0.125 inch. As would be expected, the maximum thermal gradient is indicated by the larger drilled hole 42. Thus the recorded results of FIGURE 5 clearly indicate the sensitivity of my method in recognizing voids of different size.

Figure 6:
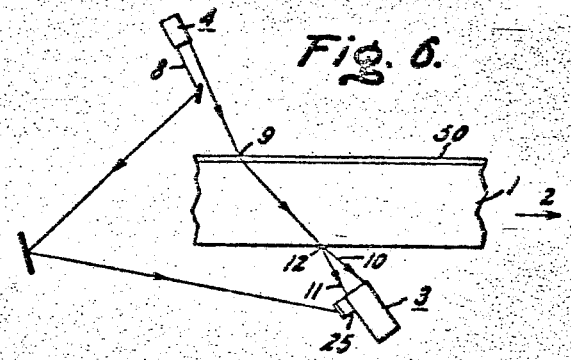
FIGURE 6 illustrates a modification of my invention wherein a variation in coating thickness may be detected and the heating and detection means are on opposite sides of the material being inspected.
Figure 7:
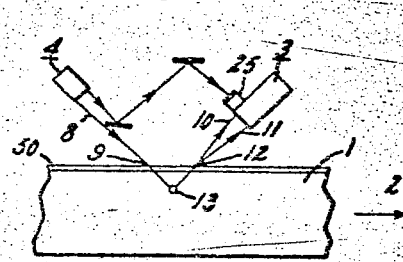
FIGURE 7 is a modification of the invention of FIGURE 6 wherein the heating and detection means are on the same side of the material being tested.

A variation in the thickness of a heat conductive coating 50 on a base material 1 is detected, as illustrated in FIGURE 6, in the following manner. A reference body 25 comprising the desired thickness of coating 50 and base material 1 is heated by splitting the radiation beam 8 that heats material 1 in FIGURE 1, thus providing uniform heating of the reference body 25 and material being inspected. The reference body 25 may also comprise a portion of the inspected material wherein the coating thickness is known to be correct. The heated reference body 25 is analogous to black body reference source 25, and detector 3 is used in the manner hitherto described for detecting voids. For purposes of simplification, it is to be understood that detector 3 in FIGURES 3, 6, 7 and 8 also includes optical and electrical circuitry and a recorder similar to the type illustrated in FIGURE 1. The detector 3 may be positioned on the opposing side of the inspected material from the radiation source 4, thus the times for the heat to pass through the inspected material and reference body may be compared by the detector and a difference in the times as indicated on recorder 31 is proportional to the variation in the thickness of the coating on the inspected material from the reference body. In the alternative, as illustrated in FIGURE 7, detector 3 may be positioned on the same side of the inspected material as the radiation source 4, in which case the times for emission of radiant energy from the coating surfaces are compared. In this alternative method, there may be a need to employ a radiation reflector on the bottom side of the base material, depending upon the thickness of the base material. These methods permit detection of a 0.010 inch variation in thickness.

Although a conventional thermal radiation detector has hereinabove been described merely to illustrate my method for detecting voids and other flaws, it is to be understood that a preferred embodiment of the apparatus in accordance with my invention comprises a detector utilizing a microscopic optical system providing a very narrow field of view and the smallest bolometer flake obtainable to achieve a greater resolution and thereby detect voids at least as small as 0.020 inch diameter. A radiant energy source is preferably attached to the side of the detector thus facilitating inspection of complex surfaces and providing a more simple and efficient device. It is to be further understood that the thermal radiation detector and energy source may remain stationary and the material to be inspected is moved in relation thereto in a manner determined by the geometry of the material. In the alternative, the detector and energy source may swing over the work from a column support such as a radial drill press and the material being inspected remains stationary.

Figure 8:
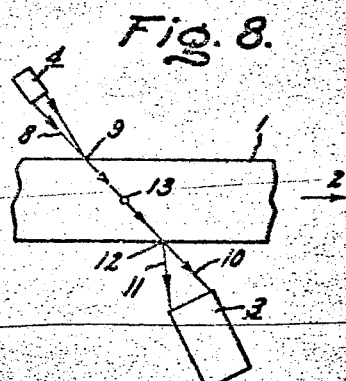
FIGURE 8 illustrates a modification of my flaw detector invention wherein a heating and detection means are on opposite sides of the material being inspected.

From the foregoing description it can be appreciated that my invention makes available an improved method and apparatus for determining the presence and size of subsurface voids, variations in coating thicknesses and other flaws in a heat conductive material. Although FIGURES 1 and 3 indicate the location of the thermal radiation detector and energy source as being on the same side of the material being inspected, it is to be understood that this is not a requirement, as illustrated in FIGURE 8 and will depend upon the particular application. In applications wherein the detector is on the opposite side of the material from the energy source, as illustrated in FIGURES 6 and 8 cold spots will occur in the presence of voids or flaws as hitherto described, thereby effecting negative thermal gradients which are detected in the same manner as hot spots or positive thermal gradients. The sensitivity and accuracy of the apparatus may be further improved by exposing opposite surfaces of the material being inspected to the detector and energy source. This technique permits an accurate determination of the depth of the void or flaw. Further, voids may be concentrated beneath the material surface in one area, thus inspection of more than one surface is preferred.

Having described a new and improved method and apparatus for detecting voids and other flaws within a heat conductive material it is believed obvious that modifications and variations of my invention are possible in light of the above teachings. Thus, other energy sources may be substituted for those disclosed hereinabove to generate the desired heat within the material being inspected. It is therefore, to be understood that changes may be made in the particular embodiment of my invention described which are within the full intended scope of the invention as defined by the following claims.

What I claim as new and desire to secure by Letters Patent of the United States is:

1. Apparatus for detecting minute subsurface flaws in a heat conductive material comprising
   an energy source for generating a constant level of thermal energy,
   means for directing the constant level of thermal energy from said source to the surface of a material being inspected whereby the energy impinging upon said surface provides heating at said surface at a constant rise in temperature in the absence of a subsurface flaw therein, said energy inducing a thermal gradient upon the surface of said material in the presence of a subsurface flaw, said surface emitting radiant energy characteristic of the surface temperature, and
   means for detecting the emitted radiant energy and transforming the detected energy into a recordable signal that indicates the presence and relative size of the subsurface flaws within said material as a function of a detected thermal gradient at the surface thereof.

2. Apparatus for noncontacting and nondestructive detection of minute subsurface flaws in a heat conductive material movable with respect to the apparatus comprising
   a source of energy for generating a constant level of thermal energy,
   means for directing and focusing the constant level of thermal energy from said source upon a relatively small area of the surface of a heat conductive material whereby the energy impinging upon the surface effects a constant rise in temperature at said surface in the absence of subsurface flaws, said energy inducing a thermal gradient upon said surface in the presence of a subsurface flaw, said surface emitting radiant energy characteristic of the surface temperature,
   an optical system in communication with the radiant energy emitted by the surface, said optical system having a narrow field of view for transmitting the radiant energy emitted by said surface to a pair of thermal radiation detectors,
   a pair of thermal radiation detectors,
   a source of reference radiant energy, means for alternately impinging the radiant energy transmitted by said optical system and the reference radiant energy source upon each of said detectors, and means for transforming the output of said detectors into a recordable signal that indicates the presence and relative size of subsurface flaws within said material as a function of a detected thermal gradient at the surface thereof.

3. The combination set forth in claim 2 wherein said source of energy comprises a source of infrared radiant energy, said means for directing and focusing the energy comprises an optical element.

4. The combination set forth in claim 2 wherein said source of energy comprises a flame impinging upon said surface and having a small cross section, and said means for directing and focusing the energy comprises a tube member wherefrom said flame is emitted.

5. A method for detecting subsurface flaws in a heat conductive material comprising the steps of heating a surface of a moving heat conductive material by directing a constant level of thermal energy upon the surface thereof to produce a constant rate of heating thereon in the absence of subsurface flaws therein and to induce a thermal gradient thereon in the presence of a subsurface flaw, detecting radiation emitted from the surface of the heated material, and transforming the detected emitted radiation into a recordable signal that indicates the presence and relative size of subsurface flaws as a function of a detected thermal gradient.

6. The method set forth in claim 5 wherein the step of heating the surface of a heat conductive material and the step of detecting emitted radiation are performed on the same side of the heat conductive material.

7. The method set forth in claim 5 wherein the step of heating the surface of a heat conductive material and the step of detecting emitted radiation are performed on opposing sides of the heat conductive material.

8. The method set forth in claim 5 wherein the step of heating the surface of a heat conductive material comprises transferring energy to the surface by conduction.

9. The method set forth in claim 5 wherein the step of heating the surface of a heat conductive material comprises transferring energy to the surface by induction.

10. A method for detecting subsurface flaws in a heat conductive material and for determining the depth and relative size of the flaws comprising the steps of heating a first surface of heat conductive material by directing a focused radiant energy source having an output of constant thermal energy upon a first subsurface of the heat conductive material to induce a constant rate of heating thereon in the absence of subsurface flaws therein and to induce a temperature gradient thereon in the presence of a subsurface flaw, moving the focused energy source in relation to the material, detecting radiation emitted from the heated first surface of the material, transforming the detected emitted radiation into a first recordable signal indicating the presence of the subsurface flaws, heating a second surface of the material by directing a focused radiant energy source having an output of constant thermal energy upon a second surface of the heat conductive material to induce a constant rate of heating thereon in the absence of subsurface flaws and to induce a temperature gradient thereon in the presence of a subsurface flaw, detecting radiation emitted from the heated second surface of the material, transforming the second detected emitted radiation into a second recordable signal indicating the presence of the subsurface flaws indicated by the first recordable signal, and comparing the first and second recordable signals to determine therefrom the depth and relative size of the flaws.

11. A method for detecting subsurface flaws in a heat conductive material comprising the steps of heating a surface of heat conductive material by directing a focused radiant energy source having an output of constant thermal energy upon a surface of a heat conductive material to induce a constant temperature rise at the surface in the absence of subsurface flaws and to induce a thermal gradient thereon in the presence of a subsurface flaw therein, moving the material in relation to the focused energy source, optically viewing a very small area of the heated surface to collect radiation emitted therefrom, focusing the collected radiation upon a first infrared energy detector, focusing a reference energy source upon a second infrared energy detector, alternately focusing the collected radiation upon the second detector while simultaneously focusing the reference energy source upon the first detector, comparing the outputs of the first and second detectors, and recording the compared outputs whereby subsurface flaws are indicated by traces of thermal gradients and the magnitude of the recorded thermal gradient is proportional to the size of the subsurface flaw.

12. A method for detecting variations in the thickness of a heat conductive coating joined to a base material comprising the steps of heating a heat conductive coating joined to a base material by directing a first part of a split focused radiant energy source having an output of constant thermal energy upon the coating surface, moving the coated material in relation to the focused energy source, optically viewing a small area of a heated surface of the coated material to collect radiation emitted therefrom, focusing the collected radiation upon a first infrared energy detector, heating a reference body comprising the desired thickness of coating and base material by directing a second part of the split focused radiant energy source upon the coating surface of the reference body, focusing radiation emitted by the heated reference body upon a second infrared energy detector, alternately focusing the collected radiation upon the second detector while simultaneously focusing the radiation emitted by the reference body upon the first detector, comparing the outputs of the first and second detectors, and recording the compared outputs whereby variations in the thickness of the coating are indicated and the magnitude of the recorded indication is proportional to the magnitude of the variation from the coating thickness on the reference body.

13. The method set forth in claim 12 wherein the step of heating a heat conductive coating and the step of focusing the collected radiation upon a first infrared energy detector are performed on the same side of the heat conductive coating.

14. The method set forth in claim 12 wherein the step of heating a heat conductive coating and the step of focusing the collected radiation upon a first infrared energy detector are performed on opposing sides of the coated base material.

(References on following page)

References Cited by the Examiner

UNITED STATES PATENTS

| | | | |
|---|---|---|---|
| 2,886,970 | 5/59 | Munker | 250—83.3 |
| 2,963,910 | 12/60 | Astheimer | 250—83.3 |
| 3,043,956 | 7/62 | Cohen | 250—83.3 |
| 3,044,297 | 7/62 | Hanken | 250—83.3 |
| 3,057,200 | 10/62 | Wood | 250—83.3 |
| 3,101,618 | 8/63 | Hance | 250—83.3 |

References Cited by the Applicant

UNITED STATES PATENTS

| | | |
|---|---|---|
| 1,869,336 | 7/32 | De Forest. |
| 2,260,186 | 10/41 | McNutt. |
| 2,264,968 | 12/41 | De Forest. |
| 2,340,150 | 1/44 | Somes. |
| 2,541,437 | 2/51 | Prescott. |

RALPH G. NILSON, *Primary Examiner.*
JAMES W. LAWRENCE, *Examiner.*